July 17, 1923.
J. G. BOLTE
1,461,965
TRACTOR STEERING MECHANISM
Original Filed June 26, 1919
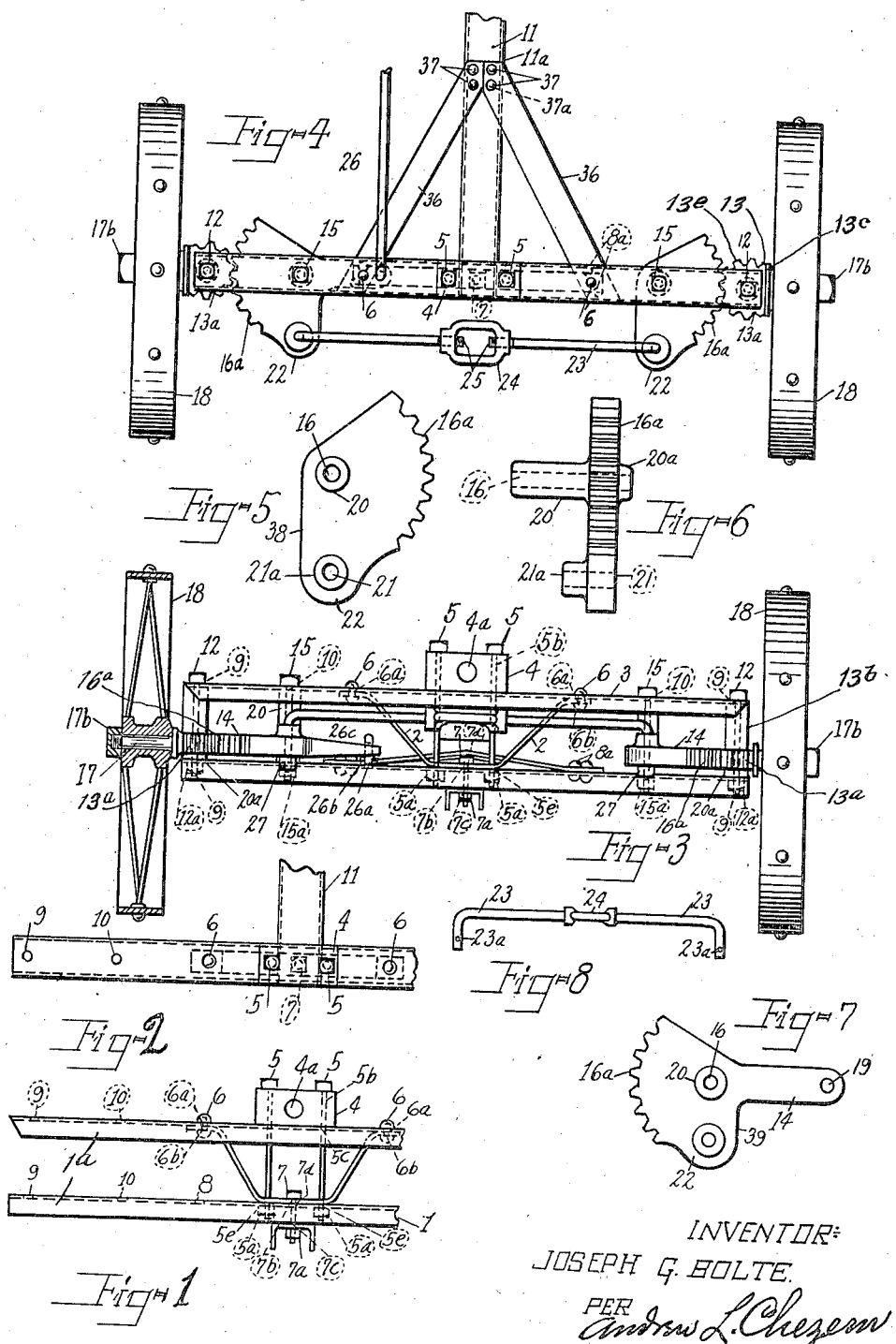
INVENTOR:
JOSEPH G. BOLTE.
PER
Andrew L. Chezem
ATTORNEY Patented July 17, 1923.

1,461,965

UNITED STATES PATENT OFFICE.

JOSEPH G. BOLTE, OF DAVENPORT, IOWA.

TRACTOR STEERING MECHANISM.

Original application filed June 26, 1919, Serial No. 306,777. Divided and this application filed December 17, 1921. Serial No. 523,250.

*To all whom it may concern:*

Be it known that I, JOSEPH G. BOLTE, a citizen of the United States, residing at the city of Davenport, in the county of Scott and State of Iowa, have invented a new and useful Tractor Steering Mechanism, of which the following is a specification.

My invention relates to improvements in tractor steering mechanism in which stub-axles are held in place or deflected by means of levers, operated by rod means which connect the said levers together and by other rod means connecting one of said levers to other steering means provided upon the tractor, such as the steering wheel or steering rod.

The objects of my invention are to provide a strong, dependable and responsive means of steering a tractor, yet simple of construction and adapted to radical turning to right angular positions under adverse conditions.

A further object is to provide connecting means between the stub axles and the steering wheel or steering worm of a tractor which is more responsive and less cumbersome than the other known means.

I desire to prosecute this as an improvement in connection with another invention which I have applied for patent upon under application filed June 26th 1919 under Serial Number 306,777, of the United States Patent Office, for tractor steering mechanism, pursuant to order for division made therein on December 17th 1920.

I attain these objects by the mechanism illustrated in the accompanying drawings in which:

Figure 1, is a front view of the trussed frame.

Figure 2 is a top plan view of the trussed frame.

Fig. 3, is a front view of the trussed frame assembled, disclosing the steering devices.

Fig. 4, is a top plan view of the trussed frame assembled disclosing the steering devices.

Fig. 5, is a plan view of a minor steering lever.

Fig. 6, is an edge view of a steering lever, serving to illustrate Figs. 5 and 7.

Fig. 7, is a plan view of a major steering lever.

Fig. 8, is a plan view of the connecting steering rod.

Similar numerals refer to similar parts throughout the several views.

The frame work of my invention consists of a trussed frame $1^a$, constructed of bars 1 and 3 secured to each other by brace bars 2, by any suitable means, the brace bar being secured to bar 1 by king bolt 7 passing through holes $7^b$ of bar 2 and hole $7^d$ of bar 1, and is secured therein by screw nut means $7^a$ which king bolt 7 also serves to secure coupling pole 11 to the frame.

Frame $1^a$ is also provided with an arch-collar 4 mounted centrally on top of bar 3 by bolts 5 through holes $5^b$ extending through the ends of collar 4 connectedly with bars 1, 2, and 3, bracing the frame.

The tractor motor, (not shown), is forwardly rotatably mounted by shaft (not shown) inserted through a hole $4^a$ in said arch 4.

Trussed frame $1^a$ is a part of the running gears of a tractor made so by coupling pole 11 and hounds 36, which hounds and coupling pole are so mounted and connected to the said trussed frame $1^a$ as to hold the same uprightly on edge and yet permit the same to have motion up and down at the ends its center forming a fulcrum or pivotal point.

Stub-axles 13 are mounted upon wheels 18 by spindle 17 and secured by nut means $17^b$, and conjunctively secured to the trussed frame $1^a$ between holes 9 by bolt 12 inserted through boxings $13^b$ and secured thereon by nut $12^a$.

The inner end of stub-axle 13 is radially provided with a flanged plate $13^e$ horizontally disposed having a plurality of cogs $13^a$ on its larger circumference, disposed conjunctively to the flange $13^c$ of spindle 17, which flanged plate $13^e$ extends laterally from boxings $13^b$ and circular flange $13^c$ opposite the said spindle 17, which flanged plate $13^e$ and spindle 17 each protrude laterally from the same circumferential radius of said boxing $13^b$.

The plurality of cogs $13^a$ provided upon the edge of plate 13 are for the purpose of engagement with similar cogs in the end of steering levers 38, and 39.

The boxings $13^b$ of stub axle 13 and boxing 20 of levers 38 and 39 are constructed with protruding boxing ends 20ª on the opposite sides of flanged plates 38 and 39 and for the purpose of creating boss bearings 20ª touching frame bar 1.

Each of said levers is constructed with a long boxing 20 and a short boxing 21ª each boxing being transversely arranged through and upon the sides of flanged plate 22 and a short boss boxing 20ª is constructed on the side of said plate 22 opposite the side whereon is constructed long boxing 20.

Plate 22 has one of its edges pinionated at 16ª for meshing with cogs 13ª.

It will be observed that major lever 39 is constructed with an elongated portion 14 having a hole 19 spaced closely to the outward end thereof, which hole 19 is for the purpose of connecting the pull rod 26 thereto; the elongated portions 14 also serving as a lever in operating said plates and boxings 20 and 20ª upon journal bolts 15 and 38, when mounted.

Said flanged plates 38 and 39 also have the journals 22 provided in one of their elongated edges for the purpose of connecting the connecting rod 23 by means of turned ends 23ª causing the said plates to act conjunctively when operated by pull rod 26.

Connecting rods 23 are connected at one of their ends by a turn-buckle 24 which serves to regulate their length, adjusting plates 38 and 39; the rod ends 25 being threaded.

The ends 23ª are secured through holes 22 by any suitable means (not shown).

I claim:

1. In a tractor steering mechanism a trussed frame supporting an arched collar capable of pivotally supporting an engine thereon and having spaced in either of its ends perpendicular boxing means, one of which boxings is formed into a stub axle having radial gears the other of said boxings is formed into a flanged plate having radial gears and lever means suitable for permitting them to be operated connectively with a steering mechanism by means of steering rods and pull rods all for the purposes specified.

2. In a tractor steering mechanism, a pair of radial plates mounted in a trussed frame by journal means, said radial plates having radial gears provided upon their edges and having a portion of their edge formed into a lever, said lever provided with hole means suitable for causing them to be connectedly operated by connecting rod means, one of said plates having another elongated portion formed in one of its edges, such elongated portion having hole means provided in its outward end suited to receiving the end of a pull rod such latter plate being suited to be operated by such pull rod in such manner as to operate conjunctively; the other flanged plate and a pair of axles all for the purposes specified.

3. In a tractor steering mechanism an axle consisting of bars trussed together by connecting braces; means for loosely mounting rotating steering levers conjunctively with rotating stub axles between the bars of the trussed frame; a trussed axle frame having an arch collar outwardly secured upon one of its bars in such manner as to brace said frame and capable of supporting the front end of a tractor thereon in such manner as to facilitate the conjunctive operation of steering mechanism provided in such trussed frame with the steering mechanism provided on said tractor; a stub-axle having a spindle on one of its ends and a plate flange horizontally disposed, provided with radial gears about its edges, at its other end, transverse bi-laterally protruding boxing means formed in such plate flange; a steering lever consisting of a plate flange horizontally disposed having a portion of its edge radially formed, its radial edge provided with gears suitably conformable to the gears of the stub-axle, another portion of said plate flange edge bluntly elongated, such blunt elongation provided with a hole spaced near its outward edge, and another portion of said plate flange more elongated than the first, such latter elongation provided with a hole spaced near its outward edge, the center of such plate flange transversely provided with a bilateral boxing supported by a journal bolt attached to a trussed frame; a steering lever consisting of a plate flange horizontally disposed having a portion of its edge radially formed, its radial edge provided with gears suitably conformable to the gears of the stub-axle, another portion of said plate flange edge bluntly elongated, such blunt elongation provided with a hole spaced near its outward edge, the said plate flange transversely provided with a bilateral boxing centrally disposed to the radius of the gears formed in the edge of said plate flange, and supported by a journal bolt attached to a trussed frame; rod means having a turn-buckle regulating joint connectedly attached between the bluntly elongated portions of a pair of steering levers, other rod means attached at one of its ends to a more elongated end attached to the steering mechanism of a vehicle, all for the purposes specified.

Davenport, Iowa, December 15, 1921.

J. G. BOLTE.

Witnesses:
FREDA SAATHOFF.
FRED LEMBURG.